April 6, 1948.  A. V. BEDFORD  2,439,198
SERVO MOTOR CONTROL CIRCUIT
Filed April 29, 1943
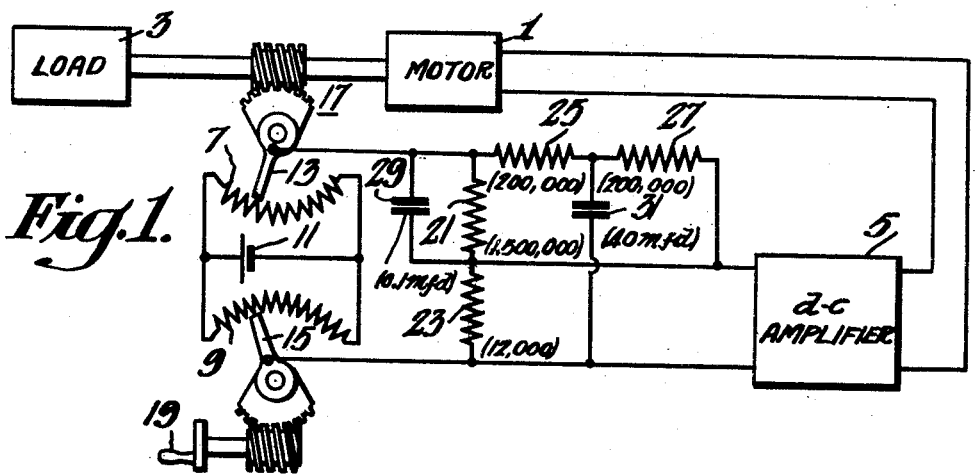
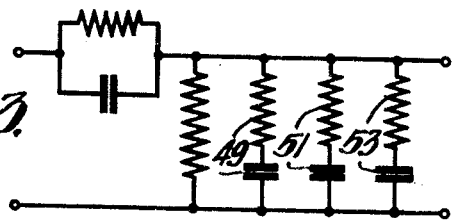
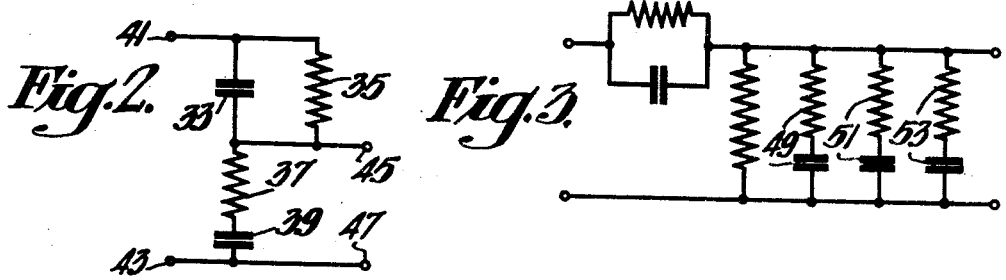
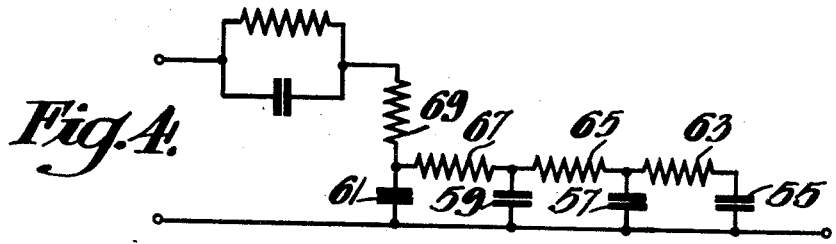
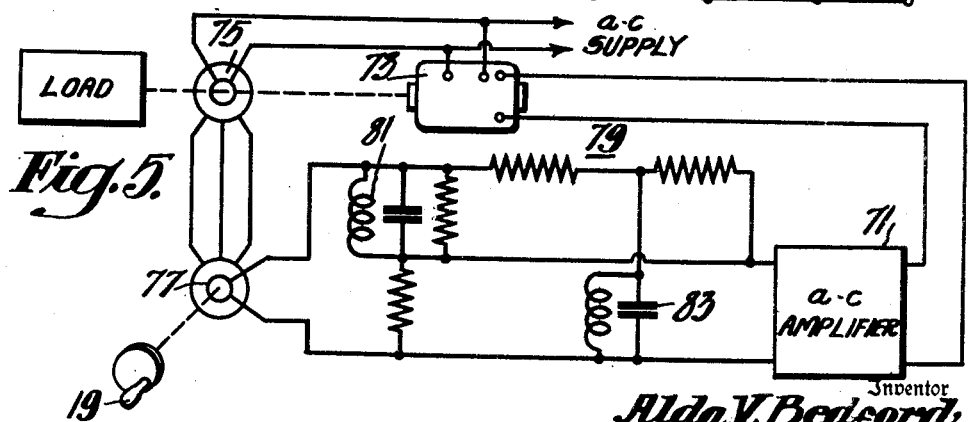
Inventor
Alda V. Bedford
By CD Tuska
Attorney Patented Apr. 6, 1948

2,439,198

UNITED STATES PATENT OFFICE 2,439,198

SERVOMOTOR CONTROL CIRCUIT

Alda V. Bedford, Princeton, N. J., assignor to Radio Corporation of America, a corporation of Delaware Application April 29, 1943, Serial No. 485,037

6 Claims. (Cl. 318—29)

This invention relates to electrical servo systems, and more particularly to improvements in the accuracy of performance of such systems.

An electrical servo system generally comprises a source of control signal, an electric motor, means for energizing the motor in response to the control signal to move a load device toward a predetermined position, and a follow-up connection from the motor to the control means whereby the effect of the control signal is diminished as the load is driven toward the final position. Owing to the fact that the energization of the motor is derived from and increases with the difference between the actual position of the load device and the position to which it is to be brought, the speed with which the motor operates is a function of this difference. Thus if the control signal is such as to require the motor to run continuously at a fairly high rate of speed, the angular lag of the load device will remain excessively large during the existence of this condition. In some applications this type of error is undesirable, for example when a gun, searchlight, directive radio antenna, or the like is to be driven so as to follow a continuously moving object.

Accordingly, it is the principal object of the present invention to provide an improved method of and means for compensating dynamic lag in the operation of electrical servo systems.

Another object is to provide an improved method of and means for increasing the effect of the control signal in an electrical servo system during periods of sustained operation of said system whereby the positional lag of the load device is gradually taken up.

These and other objects will become apparent to those skilled in the art from consideration of the following description, with reference to the accompanying drawing of which:

Figure 1 is a schematic diagram of an electrical servo system embodying the present invention, Figures 2, 3 and 4 are schematic diagrams of modifications of the invention which are applicable to the system of Figure 1, and Figure 5 is a schematic circuit diagram of a modification of the circuit of Figure 1.

According to the present invention, an auxiliary component is added to the usual control signal. This auxiliary component is made sluggish in its rate of application so that it is not appreciable except after the operation of the system has been of a somewhat uniform character for a sustained period. The auxiliary component will then contribute substantially to driving the motor so that a decreased lag occurs.

It is known that increasing the control sensitivity of servo systems has a tendency to cause over-travel and oscillation, or "hunting." This is caused by the inertia of the driving motor and load, backlash and compliance in the mechanical system and delay in the electrical circuits comprising the control loop. However, if sufficient time delay is provided in the auxiliary control signal component, the sensitivity may be increased substantially without introducing hunting conditions.

Referring to Figure 1, a reversible D.-C. motor 1 is coupled to a mechanical load 3 and connected to the output circuit of a D.-C. amplifier 5. A pair of variable voltage dividers 7 and 9 are connected across a D.-C. source 11 with their movable contacts, 13 and 15, respectively, coupled to the input circuit of the amplifier 5. The movable contact of the voltage divider 7 is mechanically coupled to the motor 1 by gearing 17. The movable contact 15 of the voltage divider 9 is similarly coupled to a mechanical input device, such as a manually operable crank 19. The connections between the variable contacts 13 and 15 and the input circuit of the amplifier 5 include resistors 21, 23, 25 and 27 and capacitors 29 and 31. The resistors 21 and 23 are connected as a voltage divider so as to attenuate the input to the amplifier by a fixed predetermined amount. The resistors 25 and 27 and the capacitor 31 are connected as a low pass filter in parallel with the attenuator. The capacitor 29 cooperates with the resistors 21 and 23 to function as a high pass filter.

The operation of the above described system is as follows:

The crank 19 is rotated to an angular position corresponding to the angular position to which the load 3 is to be driven. The voltage dividers 7 and 9 comprise a Wheatstone bridge which is unbalanced when the movable contacts 13 and 15 are not occupying corresponding positions. This unbalance produces a D.-C. voltage related in magnitude and polarity to the difference in positions of the crank 19 and the load 3. Neglecting temporarily the effects of the filter circuit, this voltage is amplified by the amplifier 5, energizing the motor 1 to drive the load 3 and with it the contact 13 into positional agreement with the crank 19 and the contact 15 respectively. When positional agreement is reached, the D.-C. input applied to the amplifier 5 becomes zero and the motor stops.

Since the magnitude of the signal applied to the amplifier 5 depends upon the difference in the positions of the contacts 13 and 15, the contact 13 must lag the contact 15 if the crank 19 is turned continuously. Consequently, the load 3 must lag the crank 19. The amount of this lag depends upon the control sensitivity of the system which is determined by the gear ratios between the movable contacts and the crank 19 and the motor 1 respectively, and the gain of the amplifier 5. If the control sensitivity is increased, for example, by increasing the gain of the amplifier, a limit will be reached whereupon any further increase in sensitivity will cause the system to hunt, owing to over-travel of the motor 1 and consequent reversal of the control signal.

The amplifier 5 is designed to provide a gain in excess of that which would normally cause hunting, and the voltage divider comprising the resistors 21 and 23 is designed to attenuate the input sufficiently to provide overall gain which is below the level required to initiate hunting.

The low pass filter comprising resistors 25 and 27 and the capacitor 31 is designed to provide very high attenuation at the frequency at which the system would tend to oscillate if the control sensitivity were increased sufficiently. Thus when the crank 19 is started, the load will follow with a relatively large lag. After rotation of the crank 19 has continued for a brief interval, the capacitor 31 will become charged to substantially the same voltage as that existing between the contacts 13 and 15, providing an increase in the input signal to the amplifier 5. This causes the motor 1 to run faster, advancing the position of the contact 13 and the load 3 with respect to the positions of the contact 15 and the crank 19 respectively.

If the crank 19 is suddenly stopped at this time, the motor will continue to run until the capacitor 31 has become discharged, driving the load a substantial distance beyond the position of agreement with the crank 19 and producing a reverse control signal. The motor 1 will then drive the load back to the proper position. Hunting or continued oscillation will not occur, however, since the capacitor 31 will not charge and discharge with sufficient rapidity to allow the input signal to the amplifier to reverse at a sufficiently high frequency.

In accordance with known practice, it may be desirable to add a component to the control signal which is proportional to the rate of change of the positional deviation. This may be accomplished by the capacitor 29. When the control signal is changed rapidly, the charge or discharge current of the capacitor 29 flows through the resistor 23, providing a voltage drop in addition to that produced by the current flowing through resistor 21. When the control signal is not changing, no current flows through the capacitor 29 and the voltage across the resistor 23 is determined solely by the voltage between the contacts 13 and 15. Typical values for the filter network components are indicated on the drawing.

Figure 2 shows a modified filter circuit comprising a capacitor 33 and a resistor 35 connected in parallel with each other and in series with a resistor 37 and a capacitor 39. The input is applied to the terminals 41 and 43 and the output is taken across the resistor 37 and the capacitor 39, at terminals 45 and 47. The charge and discharge currents of the capacitor 33 flow through the resistor 37, providing a voltage drop therein which is proportional to the rate of change of the input voltage. The capacitor 39 is charged and discharged through the resistor 35, providing relatively high attenuation at high frequencies and low attenuation at low frequencies.

Figure 3 shows a further modification of the filter circuit of the system of Figure 1, comprising a plurality of resistor-capacitor combinations 49, 51 and 53 connected across the control signal channel. The time constants of these circuits are different from each other to insure that at least one of the resistors will conduct considerable capacity control current over a wide range of frequencies. This provides a more nearly complete freedom from over-travel than the circuit of Figure 1.

Figure 4 shows a further modification of the circuit of Figure 1, comprising capacitors 55, 57, 59 and 61 connected through resistors 63, 65, 67 and 69 across the signal channel. The resistor 69 carries the charge and discharge currents of all of the capacitors, the resistor 67 carries the currents of the capacitors 55, 57 and 59, etc. The operation of the circuit of Figure 4 is substantially the same as that of the circuit in Figure 3.

Although the invention has thus been described with reference to servo systems employing direct current signals, it will be apparent that the principles set for the above may be applied also to systems using A.-C. signals.

Referring to Figure 5, a pair of synchro transformers, 75 and 77, are connected in cascade between an A.-C. supply, not shown, and the input circuit of an A.-C. amplifier 71. The output circuit of the amplifier 71 is connected to a reversible A.-C. motor 73. The rotor of the synchro transformer 75 is mechanically coupled to the output shaft of the motor 73 and the rotor of the transformer 77 is similarly coupled to the crank 19. A filter circuit 79 is included in the control signal channel between the synchro transformer 77 and the input circuit of the amplifier 71. The circuit 79 is analogous to the filter circuit in the D.-C. system of Figure 1, providing integration and differentiation of the signal envelope.

In each case the capacitors in the circuit of Figure 1 are replaced by parallel resonant circuits tuned to the frequency of the A.-C. supply. The parallel resonant combinations operate upon the envelope of the A.-C. signals in the same manner as the capacitors of Figure 1 operate upon the D.-C. signals. This is due to the fact that an A.-C. wave which is varying in magnitude includes components of frequencies other than that of a similar wave having constant amplitude. A well known example of this phenomena is the production of side bands by audio frequency modulation of a radio frequency carrier. The impedances of the parallel resonant circuits are very high at the supply frequency, 60 cycles for example, but are relatively much lower at the frequencies corresponding to the rate of change in amplitude of the control signal. Thus upon a change in the amplitude of the signal applied to the network, the parallel combinations, 81 and 83, will both present low impedances to the signal components caused by the change in amplitude.

The input to the amplifier 71 will be increased momentarily by transmission through the circuit 81 and decreased by transmission through the circuit 83. The circuits 81 and 83 are designed in accordance with principles similar to those applied in the circuit of Figure 1 so as to provide increase of transmission for very rapid changes in signal amplitude and also a gradual increase in transmission for a sustained control signal. Thus the operation of the system in Figure 5 is similar to that of Figure 1. It will be apparent that the modifications typified by Figures 2, 3 and 4 may be applied likewise to A.-C. circuits like that of Figure 5 by application of the same analogies between capacitor elements in the D.-C. circuit and parallel resonant elements in the A.-C. circuit.

I claim as my invention:

1. An electrical follow-up system including an input shaft, an output shaft which is to be driven to an angular position corresponding to that of said input shaft, a D.-C. source, means for deriving from said source a control voltage having a magnitude which is a predetermined function of the angular difference between the positions of said input and output shafts, an electric motor coupled to said output shaft, amplifier means connected to said motor for controlling the energization thereof, and a transmission network for applying said control voltage to the input circuit of said amplifier, said transmission network including attenuator means, and a plurality of filter means having different time constants connected in parallel with said attenuator means for integrating said control voltage with respect to time.

2. The invention as set forth in claim 1 including filter means connected in parallel with said attenuator means for differentiating said control voltage with respect to time.

3. An electric servo system including an input shaft, an output shaft which is to be driven to an angular position corresponding to that of said input shaft, an amplifier, a motor for driving said output shaft in response to an applied signal from said amplifier, means for deriving a control signal having a magnitude which is a predetermined function of the angular differenc between the positions of said input and output shafts, a coupling means for deriving from said control signal a modified signal having a first component proportional to said control signal, a second component which is substantially proportional to the integral of the control signal, the effective time of integration being long compared to the effective time of integration of any other circuit in the loop of the servo system, and a third component which is substantially proportional to the derivative of the control signal, means for applying said third component to said amplifier, and means for applying said modified signal to said amplifier, the gain of said amplifier being adjusted below the point of hunting when energized by said first component.

4. An electrical servo system including an output shaft which is to be driven to a predeterminable angular position, control means movably adjustable for controlling the angular position of said output shaft, means for deriving a control voltage having a magnitude and phase which is a function of the relative positions of said output shaft and said control means, motor means for driving said output shaft, coupling means for applying said control voltage to said motor means to maintain a predetermined relation between the angular position of said output shaft and said control means, said coupling means including a time delay network, and means for differentiating with respect to time the variations in amplitude of said control voltage, said means comprising a filter network including at least one series capacitor and at least one shunt resistor.

5. An electrical servo system including an output shaft, control means movably adjustable for controlling the angular position of said shaft, a motor for bringing said output shaft into a predetermined angular relation with respect to said control means, means for deriving a control voltage having a magnitude and phase proportional to deviations from said predetermined position, means for applying said control voltage to said motor, means for simultaneously applying a voltage to said motor proportional to the time derivative of said control voltage, and integrating means for applying to said motor an additional voltage proportional to said control voltage but delayed in time so that it becomes effective only after the deviation from said predetermined position has existed for a sustained period.

6. The invention as set forth in claim 5 wherein said integrating means includes a plurality of impedance-capacitance networks having different time constants.

ALDA V. BEDFORD.

REFERENCES CITED

The following references are of record in the file of this patent:

UNITED STATES PATENTS

| Number | Name | Date |
| --- | --- | --- |
| 1,554,698 | Alexanderson | Sept. 22, 1925 |
| 1,973,279 | Bernarde | Sept. 11, 1934 |
| 2,040,014 | Moseley | May 5, 1936 |
| 2,068,490 | Hull | Jan. 19, 1937 |
| 2,088,654 | Hull | Aug. 3, 1937 |
| 2,105,598 | Hubbard | Jan. 18, 1938 |
| 2,176,102 | Riggs | Oct. 17, 1939 |
| 2,233,415 | Hull | Mar. 4, 1941 |
| 2,267,681 | Fairchild | Dec. 23, 1941 |
| 2,300,742 | Harrison et al. | Nov. 3, 1942 |
| 2,352,103 | Jones | June 20, 1944 |
| 2,352,953 | Haight | July 4, 1944 |